United States Patent

Marumo

[11] Patent Number: 5,531,644
[45] Date of Patent: Jul. 2, 1996

[54] SPACE GAME FLOATER APPARATUS

[76] Inventor: Masakazu Marumo, 1-7 417, 1-chome, Kamata, Ohta-ku, Tokyo 144, Japan

[21] Appl. No.: 455,406

[22] Filed: May 31, 1995

[30] Foreign Application Priority Data

Apr. 28, 1994 [JP] Japan .................................. 6-113496

[51] Int. Cl.$^6$ .................................................. A63G 31/16
[52] U.S. Cl. .............................. 472/68; 472/59; 472/130; 244/158 R; 434/34
[58] Field of Search .................................. 472/50, 68, 59, 472/130, 131, 135, 136; 434/30, 34, 55; 244/158 R, 159, 163, 23 R, 73

[56] References Cited

U.S. PATENT DOCUMENTS

| 3,064,364 | 11/1962 | Schueller | 434/34 |
| 4,487,410 | 12/1984 | Sassak | 472/131 |
| 4,678,438 | 7/1987 | Vykukal | 434/34 |
| 5,302,130 | 4/1994 | Sieving | 434/55 |

*Primary Examiner*—Kien T. Nguyen
*Attorney, Agent, or Firm*—Dickinson, Wright, Moon, Van Dusen & Freeman

[57] ABSTRACT

A space game floater apparatus is disclosed, which can be utilized by any person for obtaining simulation experiment similar to space floating or enjoying various space games without need of any preliminary training.

A dome-like floating space shell defines an inner artificial floating space, in which is sealed air supplied as pressurized gas under 2 to 3 atm. from a gas pressure control unit. A floater provided in the artificial floating space has a buoyancy vessel part and a support part in which a floating person rides. The floating person enters the artificial floating space through a gate unit and rides in the support part of the floater for steering the floater for floating operation thereof in the artificial floating space.

8 Claims, 3 Drawing Sheets

SPACE GAME FLOATER APPARATUS

BACKGROUND OF THE INVENTION

This invention relates to space game floater apparatuses for permitting on-ground simulation experiences of space floating and various space games to be played in a floating state.

Heretofore, as enjoyment utilizing "buoyancy", there are skin diving in the sea, underwater walking with underwater scooter, floating in atmosphere with a floating vessel, drifting with a hot balloon, etc.

These prior art enjoyment techniques reside in contrivances of securing, under natural conditions of underwater space or atmospheric space and in such space, buoyancy using floating assisting apparatus capable of floating, specifically floating bags provided in such apparatus. In underwater space, the floating assisting apparatus is provided with a floating bag having a certain size, permitting considerable buoyancy with water pressure. Meanwhile, in atmospheric space the buoyancy is secured by such means as sealing helium gas or gas lighter than air in a balloon or reducing the inner density of a balloon using a gas burner.

Further, although not concerning to enjoyment, there is a well-known simulation apparatus having a predetermined evacuated space, which an astronautic trainee with an astronaut's garment worn enters for floating training in a gravity-free state.

In the case of floating in underwater space as noted above, the buoyancy itself can be readily secured, and also the floating assisting apparatus for supporting the floating person may be of a comparatively small size. However, water as the floating space offers high resistances, and therefore quick and light floating operation can not be expected. In addition, the pressure applied to the floating person varies with the depth. In the case of atmospheric space, air offers low resistance. However, in order to support and permit floating of the floating person, a giant floating bag part of the floating assisting apparatus is inevitable. Therefore, the floating person can not make light and smooth operation of rotation and inverse rotation in unison with floating assisting apparatus. Therefore, aside from pure space flying, applications to space floating simulation experiments, space games or the like have been difficult.

Further, simulation apparatus can not be handily utilized by any person, but there is danger unless sufficient preliminary training has been made. In addition, the apparatus itself is very expensive. Further, the apparatus is not suited as space game playing apparatus utilizing space.

SUMMARY OF THE INVENTION

This invention is made in view of the above state of affairs, and its object is to provide a space game floater apparatus, which can be utilized by any one without need of preliminary training for freely operating a floater as floating assisting apparatus in a predetermined artificial floating space to obtain simulation experiment similar to space floating or enjoy various space games in a floating state.

To attain the above object, the space game floater apparatus according to the invention comprises a half spherical dome-like floating space shell made of a pressure-bearing gas-tight material and defining an inner artificial floating space, which is supplied with air or the like as pressurized gas capable of pressure control from pressurized gas supply means. The floating space shell is provided with gate means, through which the floating person can enter and get out of the shell. One or more floaters are provided in the artificial floating space. The floater has a buoyancy vessel part, which is made of a gas-tight material capable of withstanding the pressure of gas in the artificial floating space, and a support part in which the floating person can ride. In the buoyancy vessel part, helium gas or the like is sealed.

In the space game floater apparatus according to the invention, the gate means has a plurality of pressure control rooms with the pressures therein reduced successively from inside toward outside the floating space shell according to the pressure difference between the pressures inside and outside the floating space shell. The pressure-bearing gas-tight material of the floating space shell is constituted by a plurality of unit, substantially right pentagonal gas-tight sheets. The edges of the outer periphery of adjacent ones of the sheets are coupled gas-tight to each other, thus forming the shell having a dome-like structure. The unit gas-tight sheets are reinforced by tension reinforcement bands or belts fitted along the diagonals of the pentagon.

In the space game floater apparatus according to the invention, the floating person is guided to and from the floating space shell through the guide means. The floating person entering the shell wears a pressure-bearing suit such that he or she can withstand the pressure of the pressurized as in the artificial floating space, for instance of 2 to 3 atm. The floating person seats or likewise rides in the support part of the floater as floating assisting apparatus for light and smooth floating operation involving revolution, spinning, etc. in the artificial floating space owing to the buoyancy action of the buoyancy vessel part in the form of floating bags or the like in the floater. The gas pressure in the artificial floating space is controlled by the pressurized gas supply means to maintain an optimum floating state of the floater in the artificial floating space.

The space game floater apparatus according to the invention is accomplished by noting that the buoyancy can be extremely increased by increasing the gas pressure in the space. It is thus possible to reduce size of the floater as floating assisting apparatus supporting the floating person, and also permit light and smooth floating operation including revolution, spinning, etc. in the artificial floating space, thus obtaining simulation experiment similar to space floating or enjoying various space games handily and without danger.

BRIEF DESCRIPTION OF THE DRAWINGS

The forgoing and other objects, features and advantages of the invention will become more apparent from the following description and claims when the same is read with reference to the accompanying drawings, forming a part of this application, in which:

DETAILED DESCRIPTION OF THE PREFERRED EMBODIMENT

Figure 1:
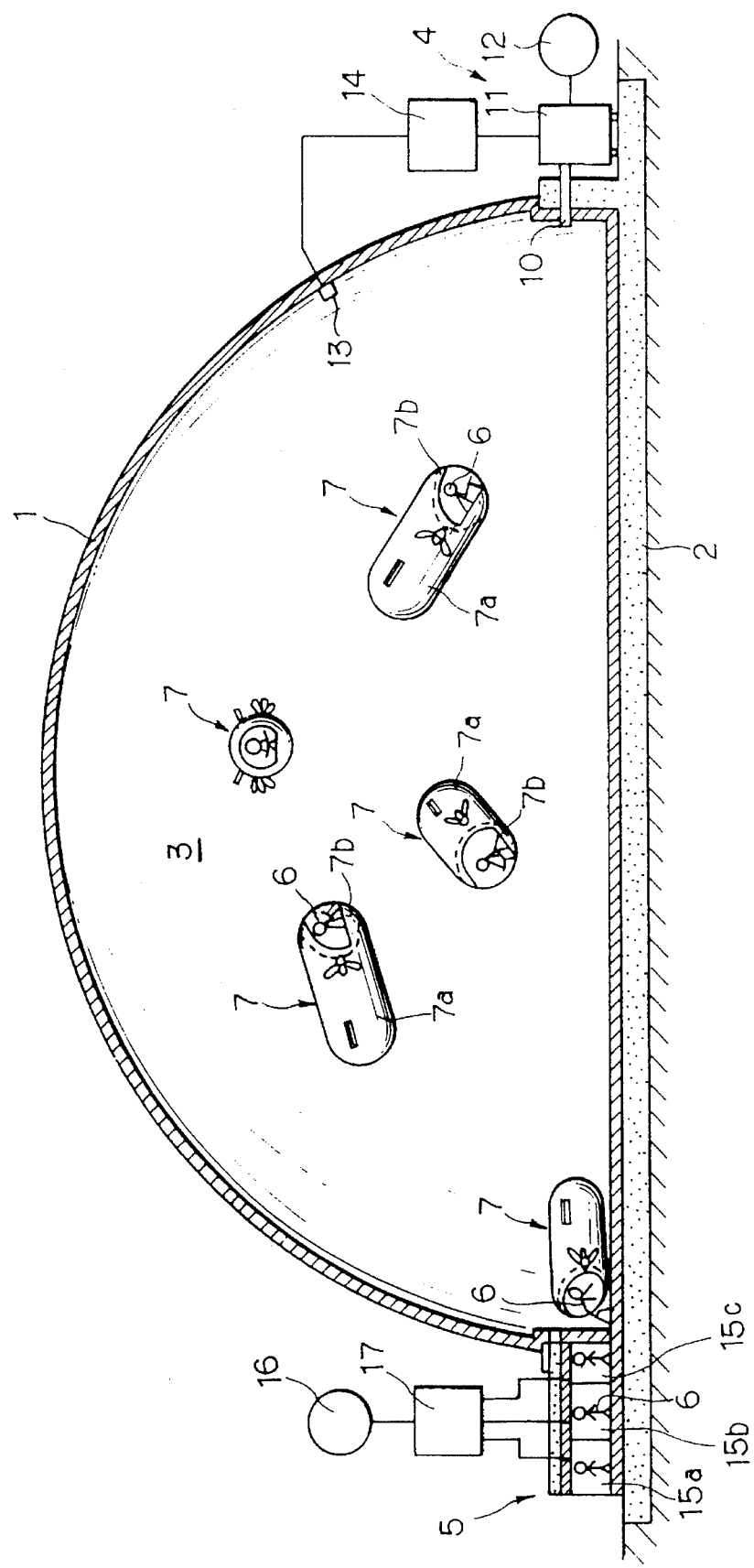
FIG. 1 is an outline view showing an embodiment of the space game floater apparatus according to the invention, with floating space vessels shown in section.

Now, an embodiment of the space game floater apparatus according to the invention will be described with reference to the drawings. Referring to FIG. 1, designated at 1 is a floating space shell, which has a half spherical dome-like shape with a diameter of 100 to 200 meters and defining an inner artificial floating space. Designated at 4 is a gas pressure control unit as pressurized gas supply means for supplying air under 2 to 3 atm. such that the pressure of the supplied air is adjustable. Designated at 5 is a gate unit or gate means, which is provided on the floating space shell 1. This gate means serves to maintain the gas pressure in the artificial floating space 3 and also guide a floating person 6 from the outside of the floating space shell 1 and into the inner artificial floating space 3.

Designated at 7 are floaters provided in the artificial floating space 3. These floaters 7 serve as assisting means for assisting free floating of floating persons 6 riding in them. Each floater 7 has a buoyancy vessel part 7a for producing buoyancy with the gas pressure in the artificial floating space 3, and a support part 7b for supporting the floating person 6 in the floater 7.

Figure 2:
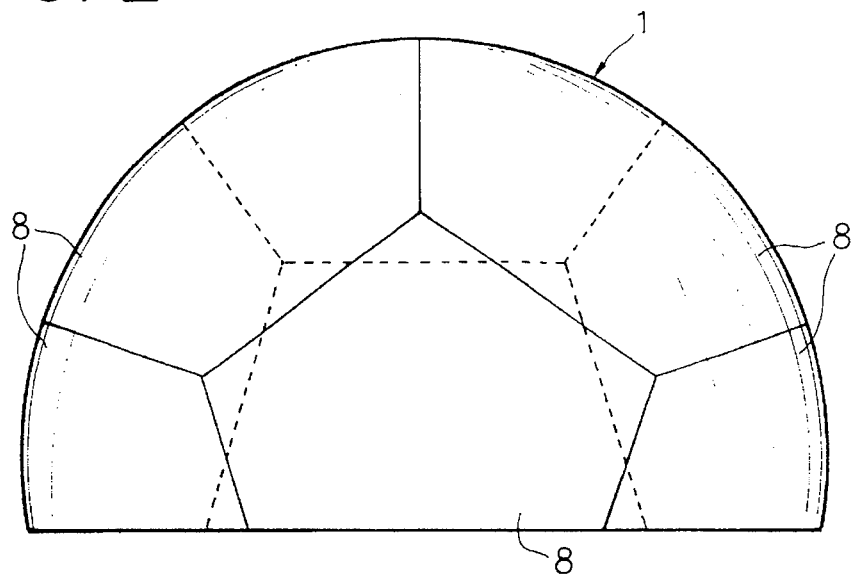
FIG. 2 is a view showing the structure of a floating space shell.

The floating space shell 1 is constructed with a pressure-bearing gas-tight material capable of sufficiently withstanding the pressure of gas sealed in the artificial floating space 3. An example of the floating space shell 1 is shown in FIG. 2. As shown, the shell 1 is formed with a plurality of unit pentagonal gas-tight sheets 8 made of a soft material capable of withstanding high gas pressure and having gas-tight property, for instance carbon fiber sheets. The edges of the outer periphery of adjacent ones of these pentagonal gas-tight sheets 8 are coupled together gas-tight, thus forming a substantially half spherical floating space shell 1 having a soft structure. By making the unit gas-tight sheets 8 to be right pentagonal in shape, the floating space shell 1 may be readily formed such that it has a dome-like half spherical shape.

As an alternative, it is possible to use a hard material such as plastics in lieu of the soft material as pressure-bearing gas-tight material. In general, any material may be used so long as it forms a giant inner space capable of sealing pressurized gas under 2 to 3 atm. Further, the dome-like half spherical shape of the floating space shell 1 is by no means limitative; for instance a box-like shell is possible.

Figure 3:
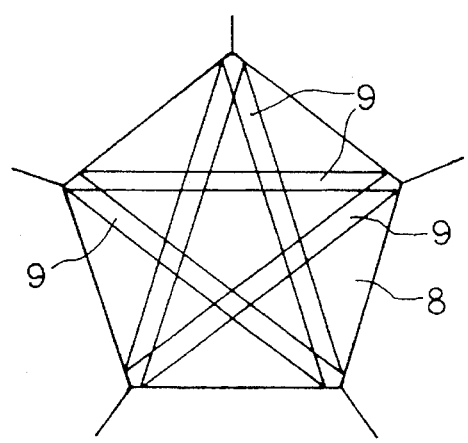
FIG. 3 is a view showing the structure of a unit gas-tight sheet constituting the floating space shell.

As shown in FIG. 3, each unit pentagonal gas-tight sheet 8 may be reinforced by fitting tension reinforcement bands or belts 9 along its diagonals. By so doing, it is possible to obtain a sheet material, in which pressure is distributed uniformly along the diagonals, so that its pressure-bearing property and durability can be improved. The reinforcement bands 9 may also be made of carbon fibers.

Referring back to FIG. 1, the gas pressure control unit 4 includes a feed duct line 10, a compressor 11, a gas supply source 12, a pressure sensor 13, and a controller 14. The feed duct line 10 extends into the artificial floating space 3 of the floating space shell 1 for maintaining the gas pressure in the space 3 to be under 2 to 3 atm. The compressor 11 is constituted by a plurality of compressors 11 connected to the duct line 10 and disposed outside the floating space shell 1. The gas supply source 12 supplies air as pressurized gas to the compressor 11. The pressure sensor 13 is disposed in the floating space shell 1 and detects the gas pressure in the artificial floating space 3. The controller 4 serves to hold the artificial floating space 3 under a predetermined gas pressure at all times through automatic control of the operation of the compressor 11 according to detected pressure information from the pressure sensor 13.

In this embodiment, air is used as pressurized gas sealed in the artificial floating space 3. However, it is possible as well to use as pressurized gas a mixture gas obtained by carbon dioxide gas and a slight amount of oxygen.

As shown in FIG. 1, the gate unit 5 has three pressure control rooms 15a to 15c. In order for the floating person 6 to get accustomed with pressure successively when entering the artificial floating space 3 under pressure from the outside, the pressures in the pressure control rooms 15c, 15b and 15a are set to successively reduced pressures from inside toward outside the floating space shell 1 according to the pressure difference between the outside and inside pressures. Controlled pressure is supplied to each of the rooms 15a to 15c from a pressure supply source 16 including a compressor through a pressure limiter 17.

Figure 4:
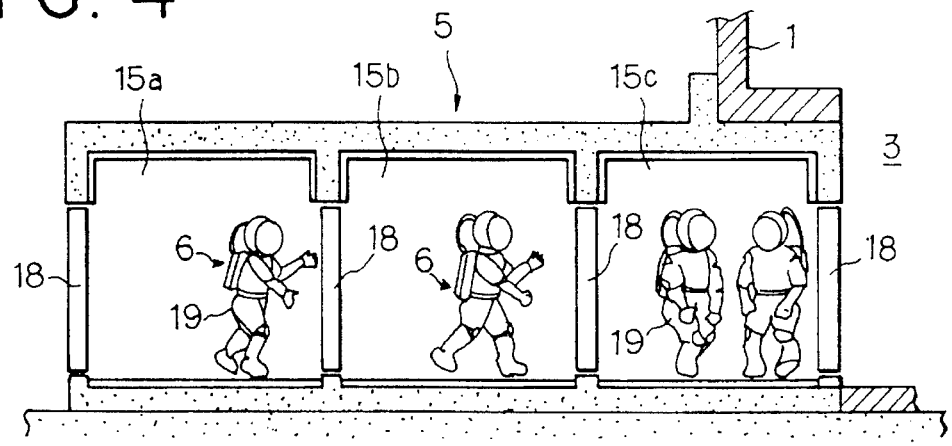
FIG. 4 is a fragmentary enlarged-scale view showing a gate means in detail.

The gate unit 5 will be further described with reference to FIG. 4.

The individual pressure control rooms 15a to 15c are defined by gas-tight doors 18 which can be freely opened and closed. The pressures in the rooms 15a to 15c are set to be progressively higher; specifically, the pressure is set to 1 to 1.5 atm. in the first room 5a which the floating person 6 first enters from the outside, 1.5 to 2.0 atm. in the intermediate room 15b, and 2.0 to 2.5 atm. in the third room 15c from which the floating person 6 enters the artificial floating space 3. When the floating person 6 enters the artificial floating space 3, he or she first wears in the first room 15a a gas-tight garment 19 which is made of a light weight, soft material having high pressure-bearing property and high gas tightness. In this state, he or she is accustomed with the first low pressure state. Then, he or she enters the central second room 15b via the gas-tight door 18. In this room 15b, he or she is accustomed with slightly higher pressure. Finally, he or she enters the third room 15c which is substantially under the same pressure condition as the artificial floating space 3. In this room 15c, his or her body is accustomed with the pressure to be ready to enter the artificial floating space 3. With the body accustomed progressively with successively increasing pressures, it is possible to prevent adverse effects on the body such as underwater illnesses. The gate unit may further include exclusive gate means with respect to the opposite direction, i.e., the direction out of the artificial floating space 3.

The gas-tight garment 19 is a fashion simulating the astronaut's garment. Specifically, it has a light weight reinforcement framework so that it is possible to withstand a pressure difference of 2 to 3 atm. between the inside and outside pressures. In addition, it is provided with life sustaining means such as an oxygen supply tank. When the floating person wears this garment, he or she can obtain simulation experience similar to that of the space astronaut.

Figure 5:
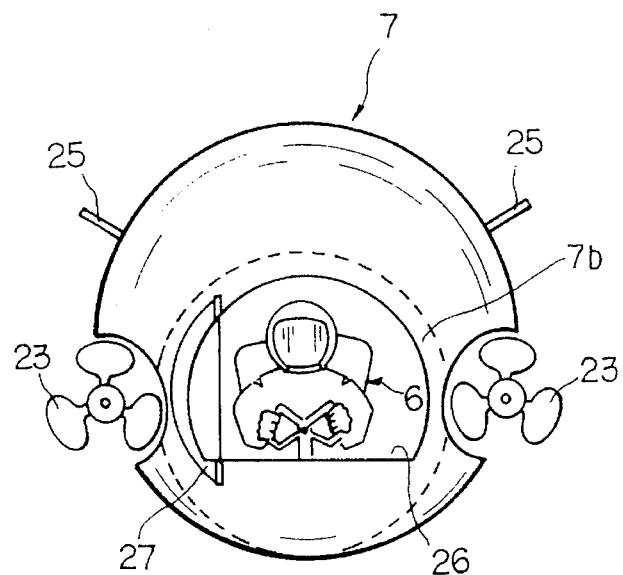
FIG. 5 is a front view showing a floater.
Figure 6:
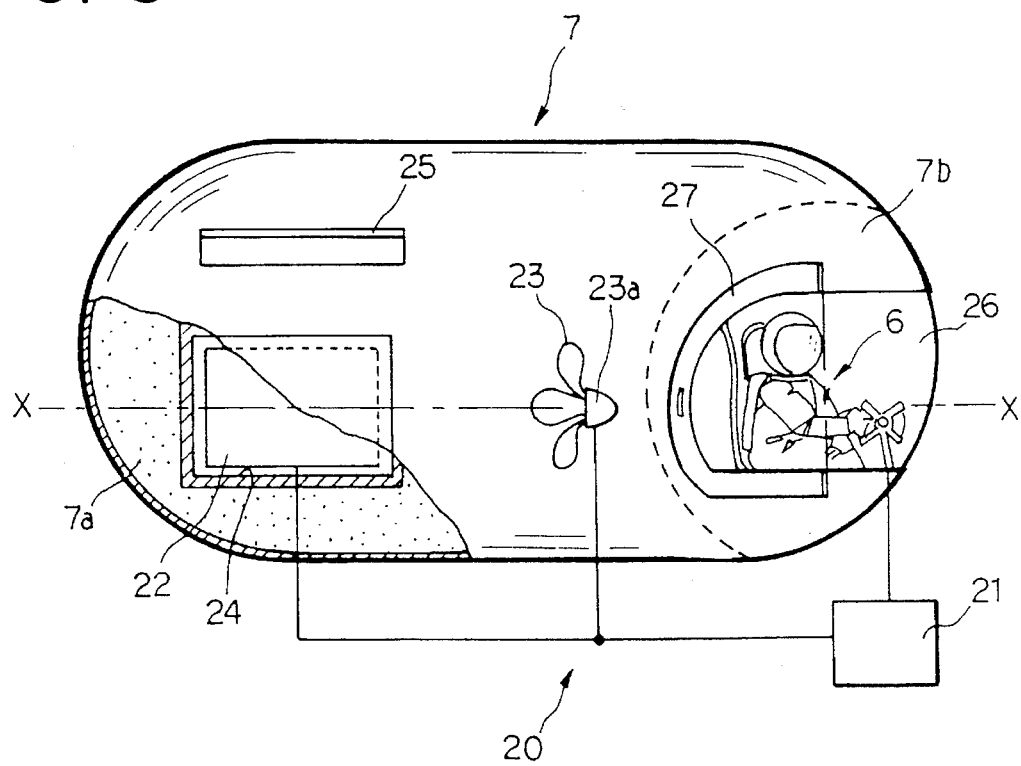
FIG. 6 is a side view, partly broken away, showing the floater.

The floater 7 as means for assisting the free floating in space is shown in greater detail in FIGS. 5 and 6. As shown, it has a buoyancy vessel part 7a and a support part 7b which is a cockpit provided adjacent to the buoyancy vessel part 7a. Further, the floater 7 has a propeller 20, with which the floating person 6 in the cockpit can cause floating operation of the floater 7. The propeller 20 has a steering unit 21 disposed in the cockpit, a battery 22 for supplying power to the steering unit 21, and a motor-driven screw 23 connected to the steering unit 21. The battery 22 is removably accommodated in a battery chamber 24 provided in part of the buoyancy vessel part 7a. Actually, a pair of motor-driven screws 23 are provided on the opposite sides of the buoyancy vessel part 7a. As the floating person 6 causes rotation of the pair motor-driven screws 23 via the steering unit 21, the floater 7 can be propelled up, down, to the left and to the right as desired for floating operation. To this end, each motor-driven screw 23 has a structure that the angle of its shaft 23a is variable. Desirably, stabilizers 25 are provided to take balance of the floater 7. More specific structure of the propeller 20 can be readily provided not only by a person in the aircraft concern but also by a general machine designer, so its detailed description is not given.

The support part 7b which is constituted by the cockpit is disposed at a position on the centroid line X—X of the whole floater 7 for stabilization of the steering. The cockpit is constructed as a gas-tight chamber of a light weight hard material such as plastics having pressure-bearing property and gas tightness. By setting the inner gas pressure in the cock pit to a mid point between the internal gas pressure in the gas-tight garment 19 and the gas pressure in the artificial floating space 3, the effect of the pressure on the floating person 6 can be alleviated, so that the floating person 6 may be safer. The cockpit has a wide angle window 26 and a seal door 27. As shown in FIG. 5, the floating person 6 wearing the gas-tight garment 19 enters the cock pit via the seal door 27 and steers the floater 7. It is possible as well that the cockpit is not a gas-tight chamber but has a structure in which the floating person 6 merely rides.

The buoyancy vessel part 7a of the floater 7 occupies whole the other part of the floater 7 than the support part 7b. It is again made of a light weight hard material such as plastics having pressure-bearing property and gas tightness. In its inside, helium or like inert gas is sealed. It may have an internal structure constituted, for instance, by a plurality of vessels like buoyancy bags with gas sealed therein and communicated with one another. With this structure, in the event of partial breakage of the buoyancy vessel part 7a it is possible to evade the danger of sudden fall of the floater in the floating state.

For the buoyancy vessel part 7a, a necessary volume is secured to obtain a buoyancy of 250 to 2,000 kg to meet the purpose of utility. As an example, where the gas pressure in the artificial floating space 3 is set to 2 and 3 atm. by filling with air as pressurized gas, the buoyancy and necessary volume are as follows.

Under 2 atm., the buoyancy and necessary volume are 250 kg (125.0 m$^3$), 500 kg (250.0 m$^3$), 1,000 kg (500.0 m$^3$) and 2,000 kg (1,000.0 m$^3$). Under 3 atm., they are 250 kg (83.3 m$^3$), 500 kg (166.7 m$^3$), 1,000 kg (333.3 m$^3$) and 2,000 kg (666.7 m$^3$).

It will be seen that the buoyancy of the buoyancy vessel part 7a can be increased by increasing the pressure in the artificial floating space 3. However, it is possible to reduce the size of the floater 7 as a whole and obtain sufficient buoyancy even under the pressure condition of 2 to 3 atm.

With the space game floater apparatus having the foregoing construction according to the invention, the floating person 6 can enter the artificial floating space 3 in the floating space shell 1 through the gate unit 5 to ride in the support part 7b of the floater 7 and drive the floater 7 with the steering unit 20 for obtaining simulation experiment similar to space floating or enjoying a space game utilizing the floater 7 in the artificial floating space 3.

While in the above embodiment the floater 7 is provided with the steering unit 20, it is possible to omit the steering unit 20. In this case, the floater 7 may be anchored with a weight or the like to the neighborhood of the gate unit 5 against the buoyancy provided by the pressure in the artificial floating space 3, and after the riding of the floating person in the floater 7, the weight may be removed to allow floating of the floater 7.

What is claimed is:

1. A space game floater apparatus comprising:

a space floating shell made of a pressure-bearing gas-tight material and defining an inner artificial floating space;

pressurized gas supply means for supplying pressurized gas capable of pressure control to the artificial floating space in the floating space shell;

gate means provided on the floating space shell for maintaining the gas pressure in the artificial floating space and also guiding a floating person when entering and getting out of the floating space shell; and a floater including a buoyancy vessel part made of a gas-tight material having pressure-bearing property with respect to gas pressure in the artificial floating space and containing sealed gas, and a support part provided adjacent to the buoyancy vessel part for supporting the floating person, the floater being provided in the artificial floating space and capable of floating with the gas pressure.

2. The space game floater apparatus according to claim 1, wherein the pressurized gas supplied by the pressurized gas supply means includes air.

3. The space game floater apparatus according to claim 2, wherein the pressurized gas is under a pressure between 2 and 3 atm.

4. The space game floater apparatus according to claim 1, wherein the gas sealed in the buoyancy vessel part is helium gas.

5. The space game floater apparatus according to claim 1, wherein the gate means includes a plurality of pressure control rooms with pressures therein controlled successively according to the pressure difference between the pressures inside and outside the space floating shell.

6. The space game floater apparatus according to claim 1, wherein the pressure-bearing gas-tight material of the floating space shell includes a plurality of unit, substantially right pentagonal gas-tight sheets, edges of the outer periphery of adjacent ones of the sheets being coupled together gas-tight, thereby forming the floating space shell in a half spherical shape.

7. The space game floater apparatus according to claim 6, wherein the unit gas-tight sheets are reinforced by tension reinforcement bands or belts fitted along the diagonals of the pentagon.

8. A space game floater apparatus comprising:

a space floating shell made of a pressure-bearing gas-tight material and defining an inner artificial floating space having a half spherical dome-like shape;

pressurized gas supply means for supplying pressurized gas capable of pressure control to the artificial floating space in the floating space shell;

gate means provided on the floating space shell for maintaining the space pressure in the artificial floating space and also guiding a floating person when entering and getting out of the floating space shell; and a floater including a buoyancy vessel part made of a gas-tight material having pressure-bearing property with respect to gas pressure in the artificial floating space and containing helium gas, and a support part provided adjacent to the buoyancy vessel part for supporting the floating person, the floater being provided in the artificial floating space and capable of floating with the gas pressure;

said gate means including a plurality of pressure control rooms with pressures therein controlled successively according to the pressure difference between the pressures inside and outside the floating space shell;

said pressure-bearing gas-tight material of the floating space shell including a plurality of unit, substantially right pentagonal gas-tight sheets made of carbon fibers, the edges of outer periphery of adjacent ones of the unit sheets being coupled together gas-tight, thereby forming the floating space shell having a half spherical dome-like shape;

said unit sheets being reinforced with tension reinforcement bands or belts provided along the diagonals of the pentagon.

* * * * *